Aug. 4, 1964 P. G. S. MERO 3,143,599

RECORDING DEVICES

Filed June 27, 1962 2 Sheets-Sheet 1

INVENTOR.
PETER G. S. MERO
BY
Wallace, Kinzer & Dorn
Att'ys.

Aug. 4, 1964 P. G. S. MERO 3,143,599

RECORDING DEVICES

Filed June 27, 1962 2 Sheets-Sheet 2

INVENTOR.
PETER G. S. MERO
BY
Wallace, Kinzer & Dorn
Att'ys.

3,143,599
Patented Aug. 4, 1964

3,143,599

RECORDING DEVICES

Peter G. S. Mero, 830 Mount Pleasant, Winnetka, Ill.

Filed June 27, 1962, Ser. No. 205,574
6 Claims. (Cl. 178—18)

This invention relates to recording devices and more particularly to a new and improved recording pen assembly for a transceiver in a graphic communication system.

Transmitter and receiver requirements, as applied to the recording apparatus of a transceiver for graphic communication, are substantially different from each other. In a transmitter, the weight of the pen employed is not a particularly critical factor because the motive power for the pen is supplied from an external source, the hand of the transmitter operator. Because the transmitter may be used by a number of different people and under circumstances not subject to continuing close control, the transmitter pen should be relatively rugged and capable of withstanding the extremes of usage to which an ordinary writing pen may be subjected.

A graphic communication receiver pen, on the other hand, must be capable of rapid movements and of high rates of acceleration in reproducing the message but should be very light in weight in order to eliminate, as far as possible, the effect of inertia of the pen upon the recorded message. Light-weight is also desirable in orde1 to reduce the output requirements for the relatively small motors used to drive the pen in a recording operation. As a consequence, the receiver pen must usually be of relatively delicate construction, and may be subject to substantial damage if it is employed in the transmitter operation in a transceiver instrument.

In at least one construction used in the prior art, the recording apparatus used for transmitter operation of a graphic communication transceiver comprises an additional support arm that is disposed parallel to and moves conjointly with the support arm for the receiver pen. This arrangement is effective to protect the receiver pen against damage during transmitter use of the instrument. However, the apparatus can be somewhat awkward to use, on the part of the operator, since the demountable stylus used for transmission purposes does not extend down to the actual writing location at the tip of the receiver pen. Furthermore, the additional support arm may add materially to the weight of the moving pen structure and thus may interfere with optimum operation of the instrument as a receiver.

It is an object of the present invention, therefore, to provide a new and improved recording assembly for a graphic communication transceiver that is effective to prevent damage to the receiver pen during transmitter operation yet which permits optimum operation of the transceiver both as a transmitter and as a receiver.

Another object of the invention is to provide for convenient removal of a transmitter pen or stylus, in a graphic communication transceiver, so that the receiver operation is effected by the use only of a lightweight relatively delicate receiver pen.

Another object of the invention is to effectively separate the functions of the transmitter pen and receiver pen, in a graphic communication transceiver, but at the same time to permit transmitter operation with the writing point of the transmitter pen in a position essentially corresponding to the recording position of the receiver pen.

It is a specific object of the invention to eliminate or minimize parallax errors in a graphic communication transceiver using a separable transmitter pen.

Throughout the following specification and the appended claims, the terms "receiver pen" and "transmitter pen" are utilized with reference to the recording instruments used in the graphic communication transceiver comprising the subject matter of the invention. It should be understood, however, that these terms are also intended to encompass other forms of recording styli or the like as, for example, heated-wire styli used with thermo-sensitive recording paper, pencil-like recording members, and the like.

Accordingly, the present invention is directed to a recording assembly for a graphic communication transceiver, this assembly comprising a pen support that is mounted in spaced relation to a recording surface and is transversely movable relative to the recording surface. The recording assembly further includes a lightweight relatively delicate receiver pen and means for mounting the receiver pen on the aforementioned pen support for movement between a recording position in which the receiver pen engages the writing surface and an inactive position in which the receiver pen is displaced from the recording position. The inactive position should be displaced both in a direction normal to the recording surface and in a direction parallel to the recording surface, as compared with the recording position of the receiver pen. A transmitter pen receptacle is mounted on the pen support and is utilized for releasably mounting a relatively large and rugged transmitter pen on the pen support with the writing tip of the transmitter pen disposed in a recording position essentially corresponding to the recording position of the receiver pen. In addition, the assembly includes means for maintaining the receiver pen in its inactive position whenever the transceiver is employed as a transmitter.

Other and further objects of the present invention will be apparent from the following description and claims and are illustrated in the accompanying drawings which, by way of illustration, show preferred embodiments of the present invention and the principles thereof and what is now considered to be the best mode contemplated for applying these principles. Other embodiments of the invention embodying the same or equivalent principles may be made as desired by those skilled in the art without departing from the present invention and the purview of the appended claims.

Figure 1:
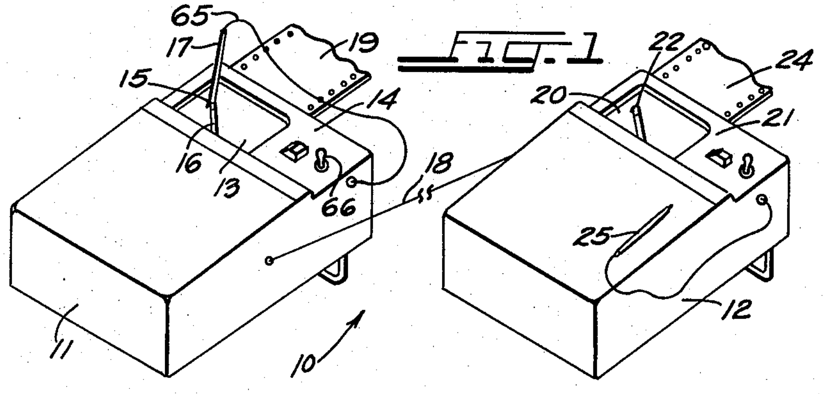
FIG. 1 is a perspective view of a graphic communication system in which the present invention may be incorporated.

The communication system 10 illustrated in FIG. 1 comprises a transmitting station 11 and a receiving station 12. In a typical system, the stations 11 and 12 may each comprise a transceiver unit capable of operation as either a receiver or a transmitter.

The transveiver 11 includes a writing or recording surface 13 which is encompassed by a frame 14; a receiver pen 15 is mounted upon a pen support arm 16 for movement into and out of recording engagement with recording surface 13. Receiver pen 15 is also movable transversely of the writing surface. Transceiver 11 also includes a removable transmitter pen 17 shown in mounted position on pen support 16. Thus, manual control of pen 17 permits the transcription of a message upon a recording medium, such as the paper web 19, supported upon recording surface 13. The message may comprise words, sketches, or any other data capable of reproduction by the pen 17. Support arm 16 constitutes a part of a linkage which controls the operation of electrical circuits within the transmitter unit 11; these circuits are utilized to develop suitable pen control signals which may be transmitted to unit 12 as by a conductive line 18 interconnecting the two stations of the system or by other suitable transmission means.

Unit 12 includes a recording surface 20 which is essentially similar in configuration to the recording surface 13 and which is bounded by a frame 21. A receiver pen 22 is mounted upon a support arm or link 23 for movement into and out of contact with a paper web or other recording medium 24 supported or recording surface 20 to inscribe a message or other data upon the paper. A transmitter pen 25 may also be used to operate unit 12 when it is employed as a transmitter. In general, the structural details and transmission system utilized in the communication apparatus of FIG. 1 may be conventional and are not critical with respect to the present invention.

As noted hereinabove, recording surface 13 of the transceiver 11 is covered with a suitable recording medium 19 which preferably comprises ordinary paper, and recording surface 20 of the unit 12 is covered with paper web 24. Both paper webs may be blank, or they may each comprise a series of pre-printed forms. The data to be transmitted is written, drawn or otherwise inscribed on recording medium 19 on surface 13, assuming unit 11 is used as the transmitter. The movements of pen 17 in transcribing this data are translated into electrical control signals which are transmitted to station 12. In unit 12, these control signals are utilized to control suitable apparatus which moves recording pen 22 across writing surface 20 and into and out of contact therewith in synchronism with movements of the transmitter pen 17. Thus, the message transcribed at unit 11 is reproduced in essentially its original form at unit 12. Operation is essentially similar when unit 12 is employed as a transmitter and unit 11 functions as a receiver.

Figures 2, 3, 4:
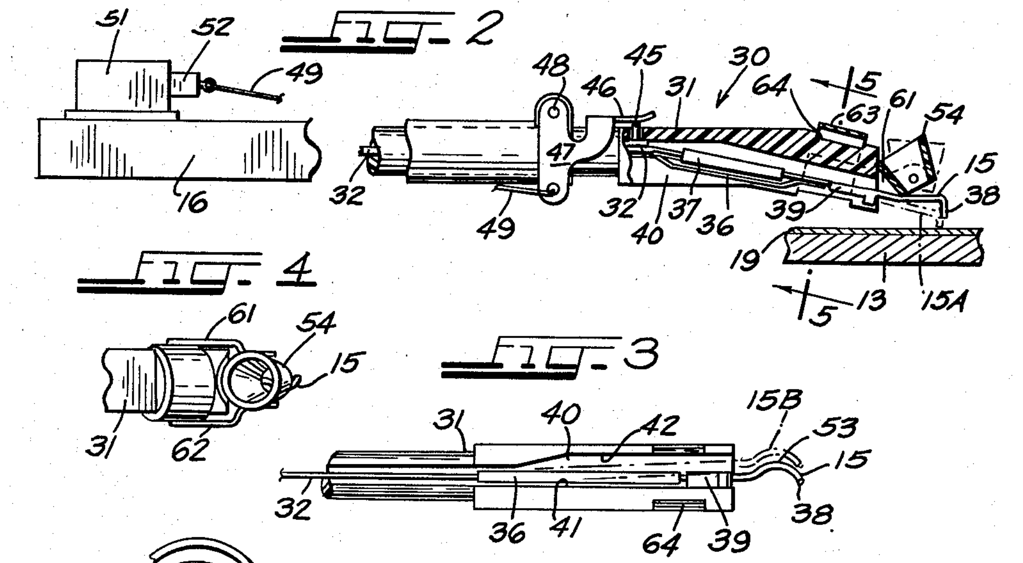
FIG. 2 is a sectional elevation view of a transceiver recording pen assembly constructed in accordance with one embodiment of the invention.
FIG. 3 is a bottom view of the recording pen assembly of FIG. 2.
FIG. 4 is a plan view of the free end of the recording pen assembly.

FIGS. 2 through 6 illustrate in detail the construction of a transceiver pen assembly 30 constructed in accordance with a preferred embodiment of the present invention. As shown in these figures, recording pen assembly 30 includes a support member 31 which is affixed to the pen support arm 16 by suitable means such as screws, rivets, or the like (not shown). Preferably, support member 31 is formed from a molded plastic material, but other suitable materials may be utilized if desired. Pen 15 is mounted upon support member 31 and comprises an elongated capillary tube 32 that extends through support member 31 and along a channel 40 in the support member. Preferably, capillary tube 32 is cemented or otherwise securely fixed to the left-hand portion of support member 31 as seen in FIG. 2. Typically, capillary tube 32 may be fabricated from stainless steel tubing having a diameter of the order of 0.02 inch. In any event, capillary tube 32 should be relatively compliant, since the tubing is bent in carrying out movements of pen 15, as described more fully hereinafter.

Capillary tube 32 is connected to pen 15 by means of a flexible plastic tubing 37. Plastic tubing 37 may be mounted on pen 15 and on the end of the ink supply tube 32 simply by pressing the plastic tubing on to the metal tubes; if desired, plastic tubing 37 may be cemented to the pen and to the metal capillary tube. The flexible plastic tubing may be formed from polyvinyl chloride or other suitable plastic and affords an even greater vertical compliance for movement of pen 15 than would be normally obtainable by means of a continuous metal tube. Preferably, a spring member 36 connects pen 15 and supply tube 32 in bridging relation to plastic tube 37 to afford adequate resiliency for operation of the receiver pen. Pen 15 terminates in a writing tip or nib 38, which in this instance constitutes a short section of the capillary tubing of the pen that is bent downwardly toward recording surface 13.

A guide member 39 is affixed to the internal portion of receiver pen 15 in spaced relation to the writing nib 38 of the pen. Guide member 39 engages one side 41 of channel 40 in support member 31 and serves to guide vertical movements of pen 15 in the course of normal receiver operation of the pen. However, it should be noted that the opposite side 42 of channel 40 is displaced substantially from key 39 and from the ink tube extending therethrough. This is done to permit substantial movement of pen 15 in a direction parallel to recording surface 13 during transmitter operation as described hereinafter.

At the left-hand end of channel 40, a plunger 45 is mounted in support member 31, the plunger being disposed in engagement with a part of ink conduit 32 and projecting upwardly and outwardly of support member 31. Plunger 45 is engaged by a lug 46 on an actuating lever 47 that is pivotally mounted upon pen support arm 16 as indicated by reference numeral 48. Lever 47 is connected by a connection wire 49 or other suitable link to a pen contact actuating device 51 that is mounted on support arm 16 at the end thereof opposite recording pen assembly 30. Pen contact actuating device 51 may comprise a small solenoid electrically connected to the receiver circuits of transceiver 11 to be energized or deenergized in accordance with a received pen contact signal.

As thus far described, recording pen assembly 30 is in many respects similar in construction to receiver recording pens presently in commercial use. Accordingly, only a brief description of the receiver pen operation is deemed necessary herein. In FIG. 2, pen 15 is shown in a normal or unactuated position, sometimes referred to hereinafter as a pen lift position, with the writing nib 38 of the pen displaced from recording medium 19 on recording surface 13. When transceiver 11 is used as a receiver, a received pen contact signal is effective to energize pen contact actuating device 57. When the pen contact solenoid is energized, the armature 52 of the solenoid is pulled inwardly thereof, moving connecting wire 49 to the left as seen in FIG. 2. As a consequence, lever 47 is pivoted in a clockwise direction about its axis 48, moving lug 46 downwardly and consequently moving plunger 45 downwardly. The result of this action is to deflect conduit 32 toward writing surface 13 moving pen 15 to an alternate position 15A in which writing nib 38 is in contact with the recording medium or surface 13. This is the recording position for the receiver pen.

When the pen support 16 is now moved transversely of recording surface 13, a line of ink is deposited upon recording medium 19. The transverse movement of the pen support is controlled by received signals and, accordingly, pen 15 traces out a recording of data as it is recorded at a distant station. When there is a break in the recorded data, as in the separation space between individual words of a written message, pen contact solenoid 51 is de-energized. Upon de-energization of the pen contact solenoid, the natural resilience of pen 15, ink supply tube 32, and spring 36 restores the receiver pen to its normal or pen lift position, thereby affording the desired interruption in the recorded data.

Figure 6:
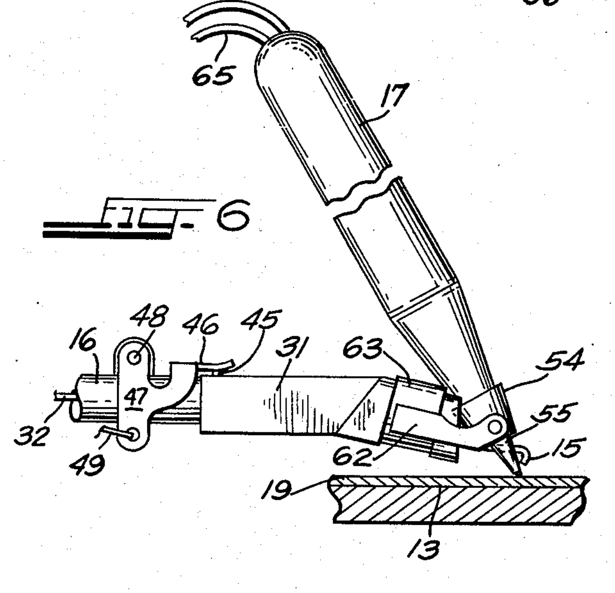
FIG. 6 is an elevation view of the recording pen assembly with a transmitter pen in mounted position thereon.

Unlike conventional recording pens, the projecting portion of pen 15 that extends beyond support member 31 is not of linear construction. Instead, a bend 53 is formed in the free end of pen 15, as best shown in FIG. 3. The bent or curved portion 53 of pen 15 is located immediately below a transmitter pen receptacle 54. Transmitter pen receptacle 54 is of truncated hollow conical configuration and is adapted to receive the writing tip 55 of transmitter pen 17, as best shown in FIG. 6. When the transmitter pen is inserted into receptacle 54, the tip 55 of the pen engages the curved portion 53 of receiver pen 15 and deflects the receiver pen in a direction parallel to recording surface 13. Thus, mounting of transmitter pen 17 in its receptacle 54 is effective to move pen 15 to a third operating position, referred to hereinafter as the inactive position of the receiver pen, in which the receiver pen is displaced from its recording pen in a direction normal to the recording surface and also in a direction parallel to the recording surface. The inactive position for pen 15 is indicated by phantom outline 15B in FIG. 3.

Figure 5:
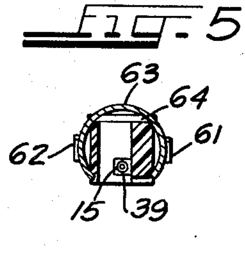
FIG. 5 is a detail sectional view taken approximately along line 5—5 in FIG. 2.

It is not practical to secure transmitter 17 to pen support member 31 in a fixed angular orientation, since different transmitter operators will want to hold the transmitter pen at varying angles relative to recording surface 13 in the course of normal writing, drawing, and other movements of the transmitter pen. For this reason, transmitter pen receptacle 54 is pivotally mounted upon a pair of projecting arms or trunnions 61 and 62 that are affixed to a collar 63. Collar 63, in turn, is engaged in a peripheral slot 64 near the free end of pen support member 31, the mounting arrangement being such that the collar is rotatable about the axis of the pen support member. It is thus seen that collar 63 is rotatable clockwise or counterclockwise, as seen in FIG. 5, whereas receptacle 54 is also free to rotate with respect to the trunnions 61 and 62 that project outwardly from the collar. The dual pivotal arrangement thus provides for substantially omnidirectional angular movement of transmitter pen 17, when in its mounted position, relative to pen support member 31, thereby permitting each transmitter operator to accommodate the position of the pen to his own writing requirements.

Transmitter pen 17 may include a suitable pen contact switch or other device for determining engagement of its writing tip 55 with recording medium 19 on recording surface 13. Devices of this kind are well known in the art and, accordingly, the internal construction of the transmitter pen is not shown in the drawings. Where pen contact is determined by a switch within the pen, it may be necessary to afford some form of electrical connection from the transmitter pen to the operating circuits of transceiver 11, as indicated by connecting conductors 65. On the other hand, an inductive system for sensing pen contact, o fthe kind described in Patent No. 2,998,482 to Myron L. Anthony, issued August 29, 1961, may be utilized in conjunction with the transmitter pen and the platen affording recording surface 13, in which case the electrical connection 65 to the operating circuits of the transceiver may be omitted.

As in any transceiver device, means are provided in transceiver 11 to change from receiver to transmitter operation. This means may take the form of a transmit-receive switch 66 (FIG. 1) of conventional character or may comprise an automatic conditioning switch mounted within transmitter pen 17. In any event, actuation of the transceiver to transmitter operation should be made effective to de-energize pen contact actuating device 51 so that the receiver pen 15 remains in its elevated position relative to the recording surface whenever the transceiver is conditioned for transmitter operation. Thus, when transmit-receive switch 66 is switched to its transmit position, the receiver pen is automatically lifted from the recording surface, due to its own resiliency and the fact that solenoid 51 is de-energized. Pen 17, when inserted in receptacle 54, deflects receiver pen 15 to its inactive position 15B (FIG. 3). In this position, the receiver pen does not engage recording medium 19 and does not interfere with operation of transmitter pen 17. Moreover, and as will be apparent from FIG. 6, the writing tip 55 of the transmitter pen occupies essentially the same recording position during transmission operation as is occupied by receiver pen 15 during receiver operation. This is of substantial importance where data pertaining to ruled forms are to be transmitted and received by transceiver unit 11, and in other instances where the position of recorded data in the recording field bounded by frames 14 and 21 of stations 12 and 12, respectively, is of substantial importance. Of course, when transmitter pen 17 is removed from the socket or receptacle 54, pen 15 springs back from position 15B to its normal position, as illustrated in FIG. 3, and is again ready for receiver operation.

Recording pen assembly 30 is effective to protect the lightweight and delicate receiver pen 15, during transmitter operation, since the receiver pen is not employed for transmitter operation and is automatically deflected to an inactive position in which there is little or no danger that the pen will be engaged with the writing surface 13. On the other hand, once transmitter pen 17 is removed from its receptacle 54, receiver operation is effected only by use of the receiver pen 15 provided specifically for this purpose. The mounting means for the transmitter pen, comprising receptacle 54, trunnions 61 and 62, mounting ring 63, can be made quite light in weight so that they do not add substantially to the inertia of the receiver pen structure and, accordingly, permit optimum receiver operation. At the same time, the mounting means employed for the transmitter pen effectively provides for omnidirectional angular deviation of the pen, within a limited range, to accommodate the requirements of different transmitter operators.

FIGS. 7–11 illustrate a recording pen assembly 80 that constitutes another embodiment of the invention. Pen assembly 80 includes a pen support member 81 which, like pen support member 31 in the first-described embodiment, is mounted at the end of a cantilever pen support arm 16. As before, the pen support member is preferably formed from a molded plastic material, but other materials may be employed for this purpose.

Figure 7:
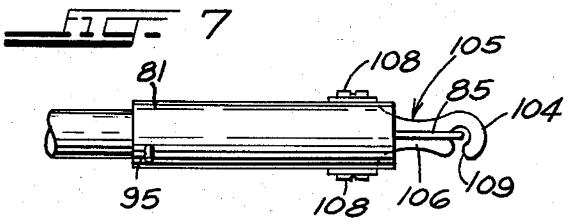
FIG. 7 is a plan view of a transceiver recording pen assembly constructed in accordance with another embodiment of the present invention.
Figure 8:
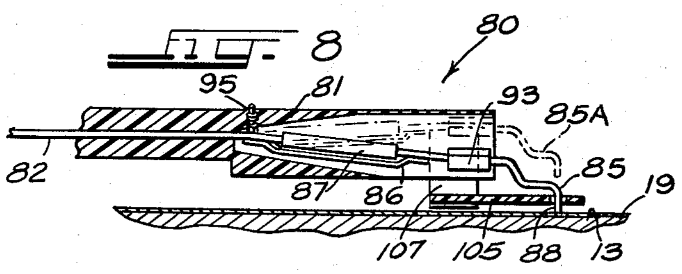
FIG. 8 is a sectional elevation view of the recording pen assembly of FIG. 7.
Figure 10:
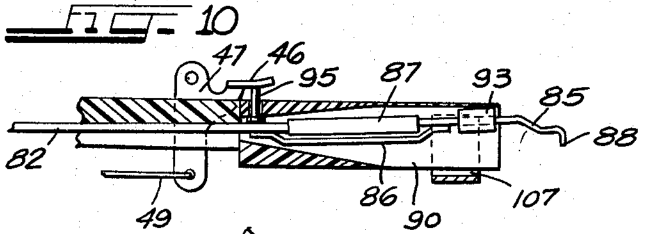
FIG. 10 is a detail sectional view taken as indicated by line 10—10 in FIG. 9.

An elongated capillary ink supply tube 82 is mounted in and extends through the left-hand portion of support member 81 (FIGS. 7, 8 and 10). The ink supply tube is connected to a receiver pen 85 by means of a short length of flexible plastic tubing 87. As before, a spring member 86 may be mounted between the end of supply tube 82 and pen 85 in bridging relation to the plastic tube to afford adequate resiliency for operation of the pen. Pen 85 terminates in a writing tip or nib 88 which again is merely a short length of the pen tubing bent downwardly toward recording surface 13.

Figure 9:
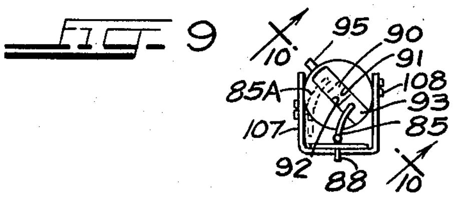
FIG. 9 is an end elevation view of the recording pen assembly of FIG. 7.
Figure 11:
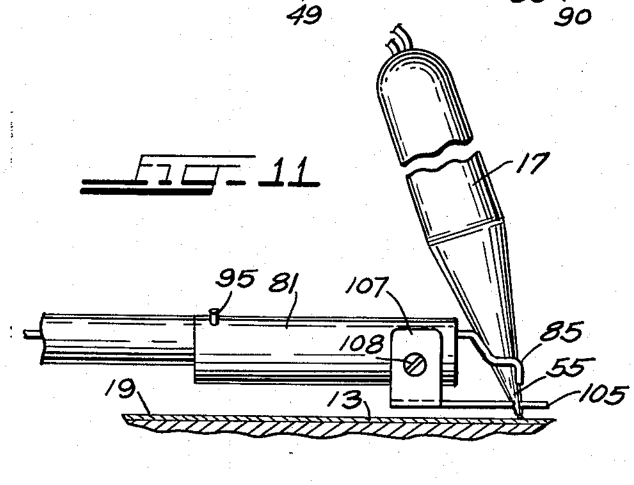
FIG. 11 is an elevation view of the recording pen assembly of FIGS. 7–10 with a transmitter pen mounted thereon.

Pen support member 81 is provided with an elongated guide channel 90 that extends backwardly through the support member for a substantial distance. Guide channel 90 is inclined at a substantial angle to the vertical, as best shown in FIG. 9. The opposed walls of the guide channel are preferably substantially parallel to each other and are identified by reference numerals 91 and 92 respectively. A relatively small guide member 93 is mounted upon pen 85 near the nib end thereof. Guide member 93 is engaged in guide channel 90 in pen support member 81 and serves to guide the pen between a recording contact position shown in solid lines in FIGS. 8 and 9 and an inactive position indicated by dash outline 85A in the same figures. In FIGS. 10 and 11, the pen 85 is shown in the inactive position.

A relatively small plunger 95 is slidably mounted in support member 81 near the left-hand end of channel 90 as seen in FIGS. 8 and 10. Plunger 95 engages the end of capillary tube 82 and projects outwardly of support member 81, where it is engaged by a lug 46 of an actuating lever 47 which, as in the previous embodiment, is pivotally mounted upon the pen support member. As before, lever 47 is connected by a suitable wire or other link 49 to a pen contact actuating device, the actuating solenoid not being illustrated in these figures.

A transmitter pen receptacle 104 is mounted on the free end of support member 81 adjacent the receiver pen 85. In this embodiment of the invention, receptacle 104 constitutes the end of a flat, resilient plastic pen alignment member 105 that may, for example, be fabricated from a polyethylene terephthalate resin or other suitable plastic. The end of the member 105 is of substantially hook-shaped configuration, this defining the desired receptacle 104. The central portion 106 of member 105 is preferably relatively thin in cross-section to permit twisting thereof in response to relatively small torsional forces. The left-hand end of member 105 is secured to a bracket 107 that is fixedly mounted on support member 81 by suitable means such as a pair of screws or rivets 108.

When recording pen assembly 80 is utilized for receiver operation, the mode of operation is essentially similar to that described hereinabove with respect to assembly 30. Thus, when data are to be recorded upon the recording medium 19 on recording surface 13, the pen contact actuating device connected to wire 49 is energized, pivoting lever 47 clockwise about its axis 48. The resulting downward movement of lug 46 pushes the plunger 95 inwardly of channel 90 and drives pen 85 to the recording position shown in solid lines in FIGS. 8 and 9. With pen 85 in its recording position, the pen may be moved across recording medium 19 to record any desired data thereon. Each time there is to be an interruption in the recorded data, the actuating device connected to lever 47 is de-energized. When this occurs, the pen returns to position 85A (FIGS. 8 and 9) as a result of its own resiliency and the action of spring 86. Thus, the basic recording operation, with respect to use for receiver operation, is the same as before.

When the unit in which assembly 80 is incorporated is used as a transmitter, actuation of a suitable transmit-receive switch such as the switch 66 (FIG. 1) is utilized to assure de-energization of the pen contact solenoid. Consequently, pen 85 is automatically moved to its elevated inactive position, the position shown in dash outlines in FIGS. 8 and 9 and in solid lines in FIGS. 10 and 11. Transmitter pen 17 may then be inserted in receptacle 104. Thereafter, transmitter operation proceeds as before. Pen 85 is not utilized in the transmitter operation but remains in its inactive position, displaced both vertically and horizontally relative to recording surface 13. Thus the writing tip 55 of the transmitter pen is made to occupy essentially the same recording position as the nib 88 of the receiver pen when the latter is in recording use. By utilizing the C-shaped receptacle 104, with the gap 109 therein, pen 85 is permitted to move back and forth between its recording position and its inactive position without being required to move first to an elevated intermediate pen lift position.

In both embodiments of the invention, the receiver recording pen is protected against damage during transmitter operation because it is effectively moved out of the way of the transmitter pen. At the same time, when in use the transmitter pen is maintained in a position in which the recording tip thereof is located in essentially the same recording position as that used for the receiver pen. The embodiment of FIGS. 7–11 is somewhat preferable, with respect to positioning of the transmitter pen, since the receptacle 104 is located closely adjacent the recording surface and changes in the angular orientation of the transmitter pen produce no more than very minute changes in the position of writing tip 55. The resilient plastic construction used for pen receptacle 104 and its support member 105 correspond quite closely to and affords the substantial advantages of the pen support member of Patent No. 3,016,419 of Peter G. S. Mero, issued January 9, 1962. The flexible but resilient plastic strip 105 permits location of pen 17 in almost any desired angular orientation, yet is stiff enough, in a direction parallel to surface 13 and transverse to arm 16, to afford accurate transmitter action.

Hence, while preferred embodiments of the invention have been described and illustrated, it is to be understood that they are capable of variation and modification, and I therefore do not wish to be limited to the precise details set forth, but desire to avail myself of such changes and alterations as fall within the purview of the following claims.

I claim:

1. In a graphic communication transceiver, a recording pen assembly comprising:
   - a pen support mounted in spaced relation to a recording surface, said pen support being transversely movable relative to said recording surface to record data on said recording surface;
   - a lightweight, relatively delicate receiver pen;
   - means for mounting said receiver pen on said pen support for movement between a recording position in which said receiver pen engages said recording surface and an inactive position in which said receiver pen is displaced from said recording position;
   - a transmitter pen receptacle, mounted on said pen support, for releasably mounting a relatively large and rugged transmitter pen on said pen support with the writing tip of the transmitter pen disposed in a recording position substantially corresponding to the recording position of the receiver pen;
   - and means for moving said receiver pen to its inactive position whenever the transceiver is employed as a transmitter.

2. In a graphic communication transceiver, a recording pen assembly comprising:
   - a pen support mounted in spaced relation to a recording surface, said pen support being transversely movable relative to said recording surface to record data on said recording surface;
   - a lightweight, relatively delicate receiver pen;
   - means for mounting said receiver pen on said pen support for movement between a recording position in which said receiver pen engages said recording surface and an inactive position in which said receiver pen is displaced from said recording position in a direction normal to and a direction parallel to said recording surface;
   - a transmitter pen receptacle, for releasably mounting a relatively large and rugged transmittter pen, receptacle mounting means mounting said receptacle on said pen support in position to maintain the writing tip of the transmitter pen disposed in a recording position substantially corresponding to the recording position of the receiver pen, said receptacle mounting means permitting substantial omnidirectional angular deviation of the transmitter pen relative to said pen support;
   - and automatic means for moving said receiver pen to its inactive position whenever the transceiver is employed as a transmitter.

3. In a graphic communication transceiver, a recording pen assembly comprising:
   - a pen support mounted in spaced relation to a recording surface, said pen support being transversely movable relative to said recording surface to record data on said recording surface;
   - a lightweight, relatively delicate receiver pen;

means for mounting said receiver pen on said pen support for movement between a recording position in which said receiver pen engages said recording surface, a pen lift position in which said receiver pen is displaced from the recording surface, and an inactive position in which said receiver pen is displaced from said recording position in a direction normal to and in a direction parallel to said recording surface;

a transmitter pen receptacle, mounted on said pen support, for releasably mounting a relatively large rugged transmitter pen on said pen support with the writing tip of the transmitter pen disposed in a recording position substantially corresponding to the recording position of the receiver pen;

automatic means for moving said receiver pen between said recording and pen lift positions in response to received signals;

and means for moving said receiver pen to its inactive position whenever the transceiver is employed as a transmitter.

4. In a graphite communication transceiver, a recording pen assembly comprising:

a pen support mounted in spaced relation to a recording surface, said pen support being transversely movable relative to said recording surface to record data on said recording surface;

a lightweight, relatively delicate receiver pen;

means for mounting said receiver pen on said pen support for movement between a recording position in which said receiver pen engages said recording surface and an inactive position in which said receiver pen is displaced from said recording position in a direction normal to and in a direction parallel to said recording surface;

a transmitter pen receptacle, for releasably engaging a relatively large and rugged transmitter pen;

receptacle mounting means mounting said receptacle on said pen support with the writing tip of the transmitter pen disposed in a recording position substantially corresponding to the recording position of the receiver pen, said receptacle mounting means including a pair of pivotal connections having mutually perpendicular axes parallel to said recording surface to permit substantially omnidirectional angular deviation, within a limited range, of the transmitter pen relative to said pen support;

and receiver pen deflection means for moving said receiver pen to its inactive poistion whenever the transceiver is employed as a transmitter, said deflection means including a curved portion of said receiver pen positioned for engagement by the transmitter pen, when the transmitter pen is mounted in its receptacle, to deflect the receiver pen to said inactive position.

5. In a graphic communication transceiver, a recording pen assembly comprising:

a pen support member mounted in spaced relation to a recording surface, said pen support member being transversely movable relative to said recording surface to record data on said recording surface and having an elongated slot therein disposed at an acute angle to the recording surface;

a lightweight, relatively delicate receiver pen;

means for mounting said receiver pen in said slot in said pen support member for movement through said slot between a recording position in which said receiver pen engages said recording surface and an inactive position in which said receiver pen is displaced vertically and horizontally, relative to said recording surface, from said recording position;

a transmitter pen receptacle, mounted on said pen support, for releasably mounting a relatively large and rugged transmitter pen on said pen support with the writing tip of the transmitter pen disposed in a recording position substantially corresponding to the recording position of the receiver pen;

and means for automatically moving said receiver pen to its inactive position whenever the transceiver is employed as a transmitter.

6. In a graphic communication transceiver, a recording pen assembly comprising:

a pen support mounted in spaced relation to a recording surface, said pen support being transversely movable relative to said recording surface to record data on said recording surface;

a lightweight, relatively delicate receiver pen;

means for mounting said receiver pen on said pen support for movement between a recording position in which said receiver pen engages said recording surface and an inactive position in which said receiver pen is displaced from said recording position;

transmitter pen receptacle means, mounted on said pen support, for releasably mounting a relatively large and rugged transmitter pen on said pen support with the writing tip of the transmitter pen disposed in a recording position substantially corresponding to the recording position of the receiver pen, said receptacle means comprising a substantially C-shaped receptacle element formed integrally with a thin, flat, resilient receptacle support member;

and means for automatically moving said receiver pen to its inactive position whenever the transceiver is employed as a transmitter.

No referencies cited.